United States Patent [19]

Dillmann

[11] Patent Number: 5,069,860
[45] Date of Patent: Dec. 3, 1991

[54] ROTARY LOCK FOR A CONTROL ROD DRIVE

[75] Inventor: Charles W. Dillmann, Morgan Hill, Calif.

[73] Assignee: General Electric Company, San Jose, Calif.

[21] Appl. No.: 548,793

[22] Filed: Jul. 6, 1990

[51] Int. Cl.[5] .............................................. G21C 7/14
[52] U.S. Cl. ..................................... 376/235; 376/242
[58] Field of Search ............... 376/227, 228, 235, 232, 376/242; 192/142, 148; 188/31

[56] References Cited

U.S. PATENT DOCUMENTS

| | | | |
|---|---|---|---|
| 756,899 | 4/1904 | Schafer | 188/31 |
| 797,448 | 8/1905 | Metcalf | 188/31 |
| 1,226,245 | 5/1917 | Ohelski | 188/31 |
| 1,294,754 | 2/1919 | Beil et al. | 188/31 |
| 2,080,544 | 5/1937 | Naugler | 192/148 |
| 3,410,381 | 11/1968 | Henshaw et al. | 192/148 |
| 3,785,923 | 1/1974 | Bratoljic et al. | 376/227 |
| 3,945,514 | 3/1976 | Dose | 376/227 |
| 4,015,696 | 4/1977 | Lichti | 188/189 |
| 4,238,288 | 12/1980 | Anikin et al. | 376/228 |
| 4,423,002 | 12/1983 | Wiart et al. | 376/227 |
| 4,624,825 | 11/1986 | Martin et al. | 376/227 |
| 4,661,307 | 4/1987 | Guillot | 376/232 |

Primary Examiner—Brooks H. Hunt
Assistant Examiner—Frederick H. Voss
Attorney, Agent, or Firm—Robert R. Schroeder

[57] ABSTRACT

A rotary lock is disclosed for preventing rotation of a shaft, such as a shaft used in a control rod drive for a nuclear reactor. The lock includes a stationary housing for receiving the shaft, and an arm extending outwardly from the shaft. At least one pin is joined to the housing for circumferential restraint and is positionable in a withdrawn position away from the arm for allowing the arm to rotate with the shaft without obstruction from the pin. The pin is also positionable in a deployed position contacting the arm for preventing rotation of the arm and shaft. Means are provided for selectivity positioning the pin in the withdrawn and deployed positions.

20 Claims, 5 Drawing Sheets

ROTARY LOCK FOR A CONTROL ROD DRIVE

TECHNICAL FIELD

The present invention relates generally to control rod drives used in nuclear reactors and, more specifically, to a rotary lock effective for preventing rotation of the control rod drive when actuated.

BACKGROUND ART

In one type of nuclear reactor, control rods are selectively inserted and withdrawn from a nuclear reactor vessel for controlling the operation thereof. Each of the control rods is typically positioned by a conventional control rod drive which includes a ball screw or spindle threadingly engaging a ball nut for raising and lowering the ball nut as the spindle is rotated either clockwise or counterclockwise. A hollow piston rests upon the ball nut at one end thereof and at its other end is conventionally joined to the control rod. Displacement of the ball nut provides displacement of the piston which in turn inserts or withdraws the control rod in the reactor vessel.

In order to achieve faster insertion of the control rod than could be obtained by normal rotation of the ball spindle, which is conventionally referred to as a scram operation, a rapid flow of high-pressure water is injected through the control rod drive past the piston for lifting the piston off the ball nut in a relatively short time for quickly inserting the control rod into the reactor vessel. The high-pressure water is channeled to the control rod drive through a scram line pipe attached to a high-pressure water accumulator.

In one type of occurrence which allows for rapid backflow of the water past the piston, due to, for example, a break in the scram line, the backflow may cause a large reverse pressure on the piston which in turn provides a back force on the control rod ball nut. This back force can cause reverse rotation of the ball spindle with corresponding withdrawal of the control rod. Withdrawal of one of the control rods due to such a backflow occurrence may cause damage to adjacent fuel in the reactor vessel, requiring replacement thereof leading to undesirable down time of the reactor and economic losses.

In order to prevent the above occurrence, a conventional electromechanical brake is provided in the control rod drive for holding the ball spindle from rotating unless the brake is energized. The brake is sized for restraining rotation of the ball spindle against such forces due to backflow of water over the piston when the control rod drive motor is not operating. And, when the control rod drive motor is operating, the motor itself is sized for providing adequate torque for resisting the forces due to the backflow of water in the event of the above-described occurrence.

To ensure operability of the brake, the brake is periodically tested. However, the brakes are located adjacent to the reactor vessel, which is inaccessible during operation of the reactor due to the radiation field emanating from the reactor vessel. The radiation field continues at reduced levels also during shutdown of the reactor, which would require inspectors to wear suitable protective clothing and limit their time in the area. In one nuclear reactor embodiment, there are about 205 control rod drives, including a respective number of brakes, which would necessarily require a substantial amount of time for testing all of the brakes. Testing of the brakes during reactor shutdown would, therefore, be relatively costly to accomplish, which is additionally economically undesirable since the reactor is not operating for producing power.

Since conventional electromechanical brakes typically utilize braking pads for restraining rotation of a rotor disc, they are subject to slippage. Slippage can result in undesirable partial withdrawal of the control rod during backflow ocurrence, and also requires additional means for effectively testing the torque-resisting capability of the brake.

OBJECTS OF THE INVENTION

Accordingly, one object of the present invention is to provide a new and improved rotary lock for preventing rotation of a shaft.

Another object of the present invention is to provide a rotary lock effective for providing a positive rotational restraint of the shaft.

Another object of the present invention is to provide a relatively simple and compact rotary lock for a shaft.

Another object of the present invention is to provide a rotary lock which is relatively easily testable.

Another object of the present invention is to provide a rotary lock for preventing rotation of a control rod drive for a nuclear reactor and which may be actuated and tested remotely from the rotary lock.

DISCLOSURE OF INVENTION

A rotary lock is disclosed for preventing rotation of a shaft, such as a shaft used in a control rod drive for a nuclear reactor. The lock includes a stationary housing for receiving the shaft, and an arm extending outwardly from the shaft. At least one pin is joined to the housing for circumferential restraint and is positionable in a withdrawn position away from the arm for allowing the arm to rotate with the shaft without obstruction from the pin. The pin is also positionable in a deployed position contacting the arm for preventing rotation of the arm and shaft. Means are provided for selectively positioning the pin in the withdrawn and deployed positions.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figure 1:
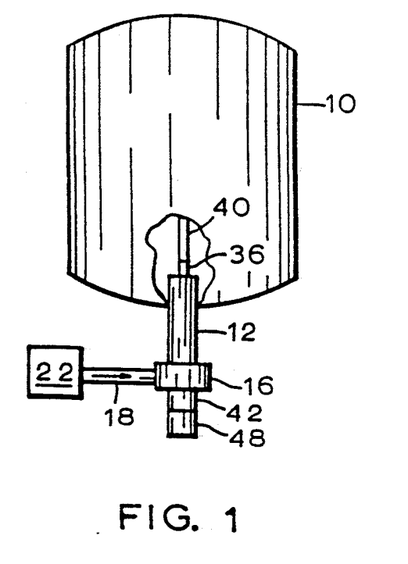
FIG. 1 is a schematic representation of a nuclear reactor vessel including a control rod drive having a rotary lock in accordance with one embodiment of the present invention.
Figure 2:
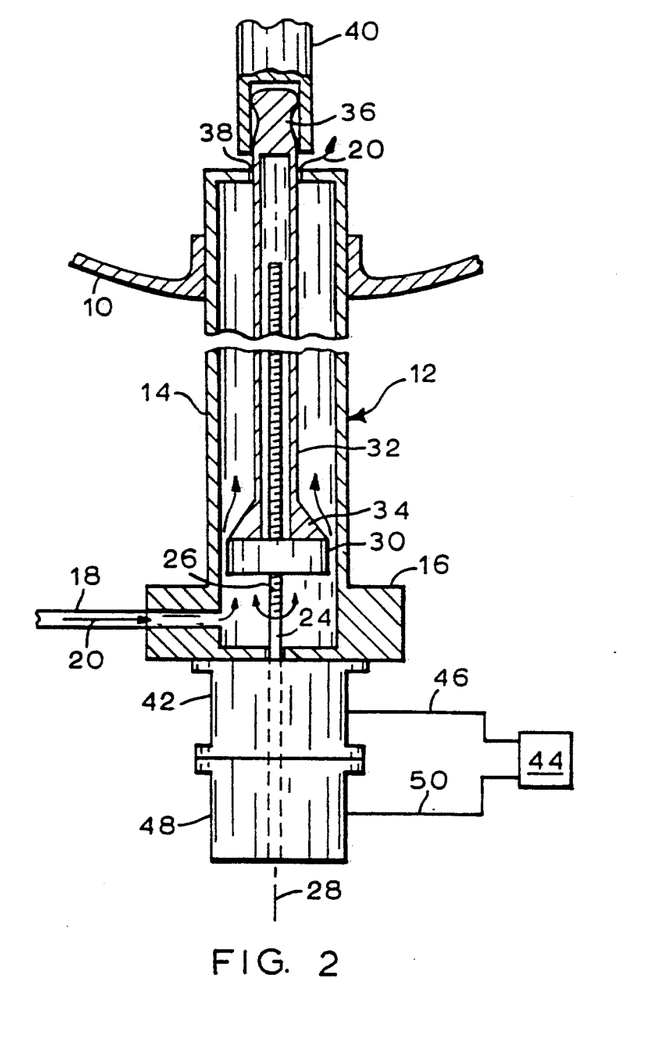
FIG. 2 is an enlarged sectional view, partly schematic, of the control rod drive illustrated in FIG. 1.

Illustrated in FIG. 1 is an exemplary nuclear reactor vessel 10 having a plurality of fine motion control rod drives 12 (FMCRD), only one of which is shown. In one exemplary embodiment, there are 205 FMCRDs 12 extending into the vessel 10 through the bottom thereof. Referring also to FIG. 2, an enlarged, sectional view of one of the control rod drives 12 is illustrated. The rod drive 12 includes a tubular housing 14 extending outwardly from the vessel 10 and conventionally secured thereto. The housing 14 is conventionally connected to a manifold 16 which is disposed in flow communication with a scram line or conduit 18 which is conventionally selectively provided with high-pressure water 20 from a conventional high-pressure water accumulator 22 conventionally joined to the scram line 18.

Conventionally disposed inside the housing 14 is a conventional ball screw or spindle 24, which in this exemplary embodiment includes conventional right-handed threads 26. The control rod drive 12 includes a longitudinal centerline axis 28, with the housing 12 and spindle 24 being disposed coaxially therewith.

A conventional ball nut 30 is positioned over the spindle 24 and is conventionally restrained from rotating therewith so that as the spindle is rotated in a clockwise direction, the ball nut is translated in a downward direction away from the vessel 10, and when the spindle is rotated in a counterclockwise direction, the ball nut 30 is translated in an upward direction toward the vessel 10. A conventional hollow, elongate piston 32 is disposed coaxially with the spindle 24 and includes a conical base end 34 which rests on the ball nut 30, and a tip end 36 extending through a central aperture 38 in the outer end of the housing 14 into the vessel 10. The tip end 36 is conventionally coupled to a respective control rod 40 by a bayonet coupling, for example.

The spindle 24 extends downwardly from the manifold 16 through a conventional electrical motor 42 which selectively rotates the spindle 24 in either the clockwise direction or counterclockwise direction. The motor 42 is electrically connected to a conventional control 44 by a conventional electrical line 46 for selectively controlling operation of the motor 42.

In accordance with the preferred embodiment of the present invention, the rod drive 12 further includes a rotary lock 48 joined to the motor 42 into which extends the spindle 24, also referred to as an input shaft 24. The rotary lock 48 is electrically joined to the control 44 by a conventional electrical line 50 for selectively locking and unlocking, or releasing, the input shaft 24.

Figure 3:
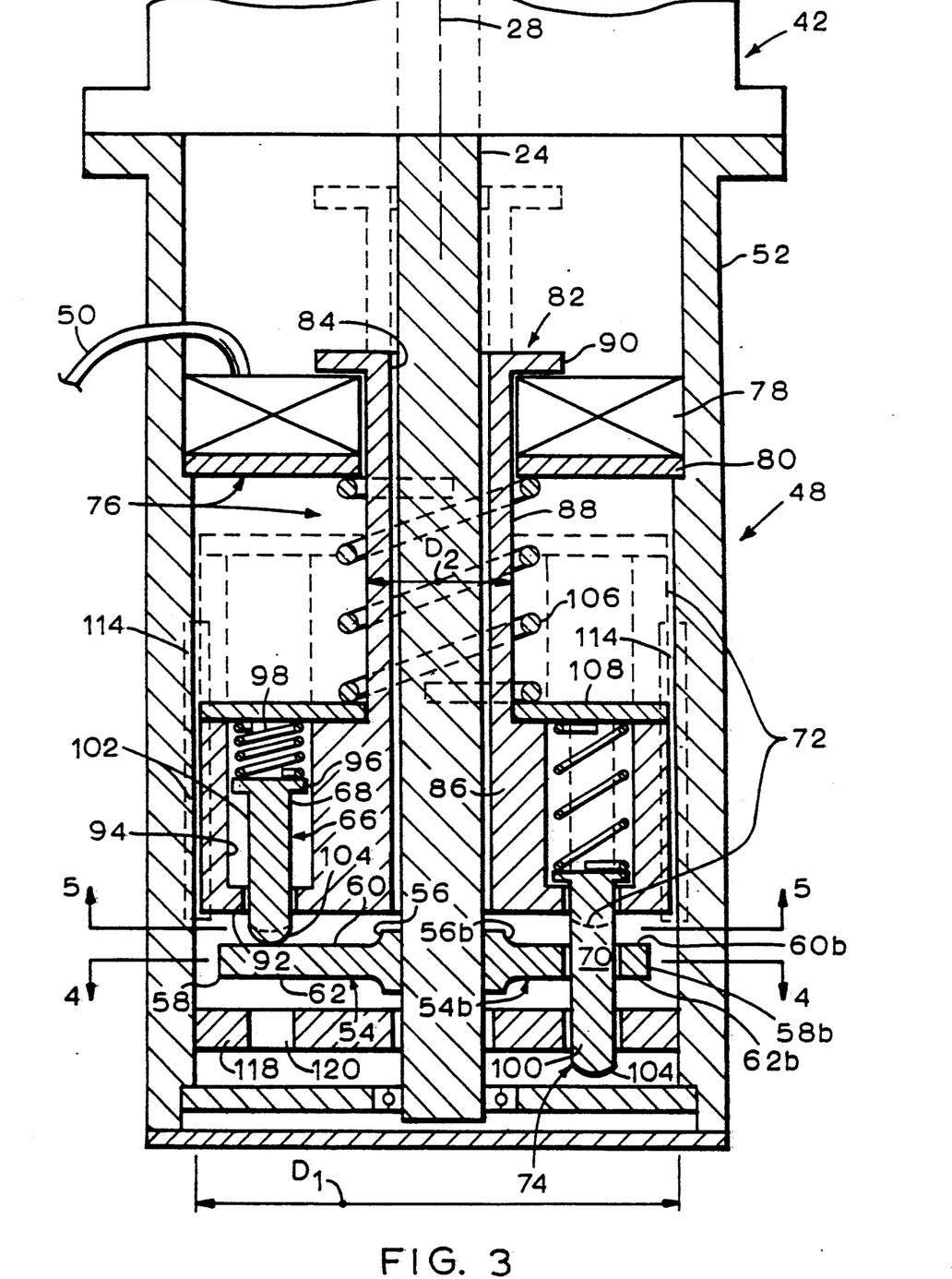
FIG. 3 is a longitudinal sectional view of the rotary lock in accordance with one embodiment of the invention taken along line 3—3 as shown in FIG. 4.
Figure 4:
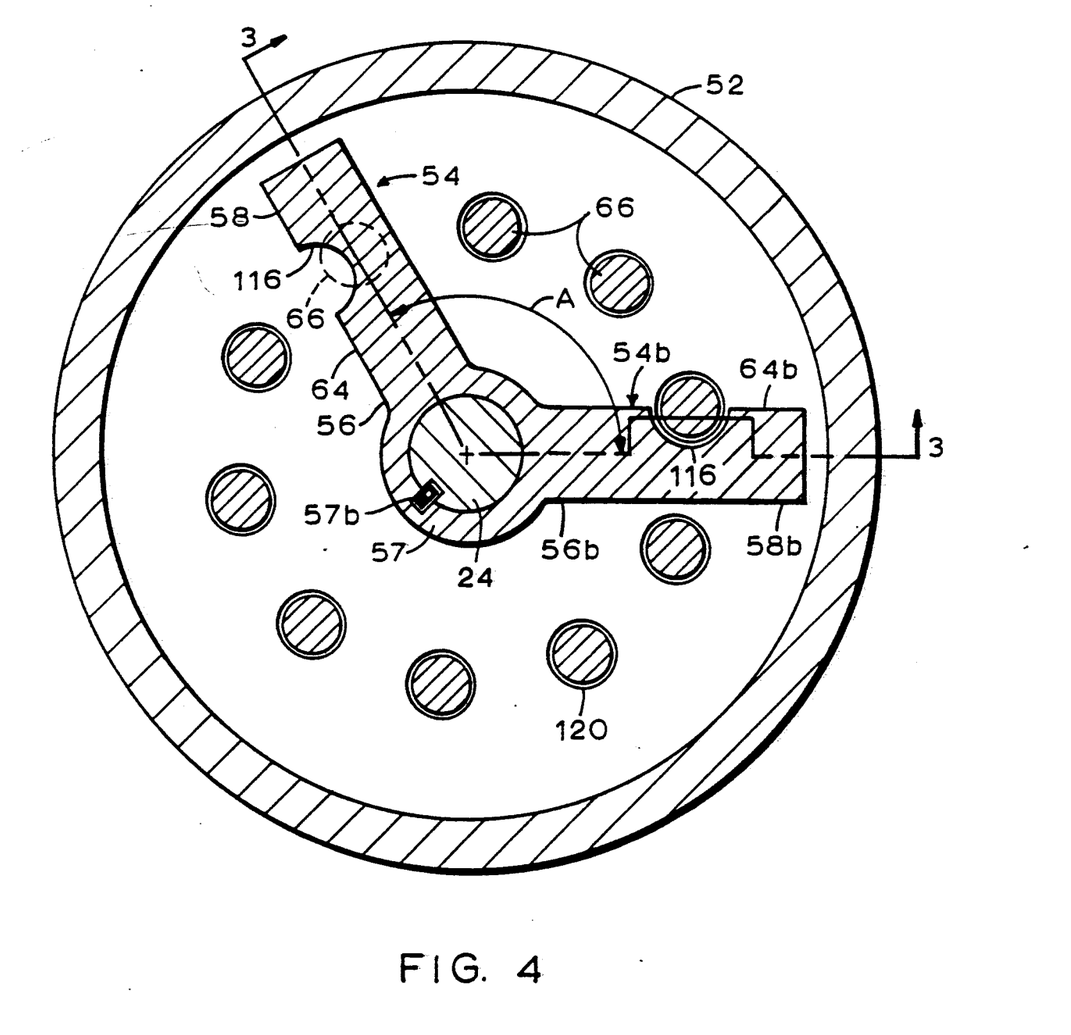
FIG. 4 is a transverse sectional view of the rotary lock illustrated in FIG. 3 taken along line 4—4.

FIG. 3 illustrates in more particularity the rotary lock 48. The lock 48 includes an annular tubular stationary housing 52 which is conventionally fixedly secured to the motor 42 by bolts, for example (not shown). The housing 52 receives an end portion of the shaft 24 and is coaxial therewith. At least one arm 54 and preferably a pair of arms 54, including a first arm designated 54 and a second arm designated 54b, are fixedly joined to the shaft 24 in the housing 52. More specifically, each of the arms 54 includes a proximal end 56,56b fixedly joined to the shaft 24 by an integral hub 57 prevented from rotating by a conventional key 57b. The arms each further include a distal end 58,58b extending radially outwardly from the shaft 24 and substantially perpendicular thereto; a top surface 60,60b; an opposite, bottom surface 62,62b; and a side surface 64,64b as shown in FIG. 4.

At least one pin 66 and preferably a plurality of pins 66 each includes a proximal portion 68 joined to the housing 52 as described in more detail below for circumferential restraint relative to the shaft 24 and centerline 28. The pin 66 also includes an intermediate portion 70, and the pin 66 is positionable in a withdrawn position 72 as shown in dashed line in FIG. 3 away from the arm top surface 60 for allowing the arm 54 to rotate with the shaft 24 without obstruction from the pin 66. The pin 66 is also positionable in a deployed position 74 as shown in solid line in FIG. 3, for allowing the pin intermediate portion 70 to contact the arm side surface 64 at the arm distal end 58 for preventing rotation of the arm 54 and shaft 24. Means are provided for selectively positioning the pins 66 in the withdrawn and deployed positions as indicated generally in FIG. 3 at 76.

More specifically, the pin positioning means 76 includes means for urging the pins 66 into one of the withdrawn and deployed positions. And, an actuator, such as for example an electric solenoid 78, is energizable for moving the pins 66 into the other of the withdrawn and deployed positions.

The solenoid 78 is a conventional coil of wire suitably mounted around the shaft 24 to a support plate 80 conventionally fixedly secured in the housing 52. A magnetic plunger 82 is provided for magnetic cooperation with the solenoid 78 and is slidably disposed in the solenoid 78 and joined to the pins 66 for moving the pins 66 when the solenoid is energized. The plunger 82 is preferably tubular and includes a central bore 84 disposed coaxially about the shaft 24 for longitudinal movement relative thereto, an annular base plate 86 having a diameter $D_1$ slightly less than the inside diameter of the housing 52 for allowing longitudinal movement therein. The base plate 86 is disposed at one end of the plunger 82 adjacent to the arm top surfaces 60,60b. The plunger 82 also includes an intermediate portion 88 extending from the base plate 86, and is preferably integral therewith, and through the solenoid 78. An annular flange 90 is conventionally fixedly joined to the intermediate portion 88, for example by screws or by being formed integrally therewith, at an opposite end of the plunger 82.

Figure 5:
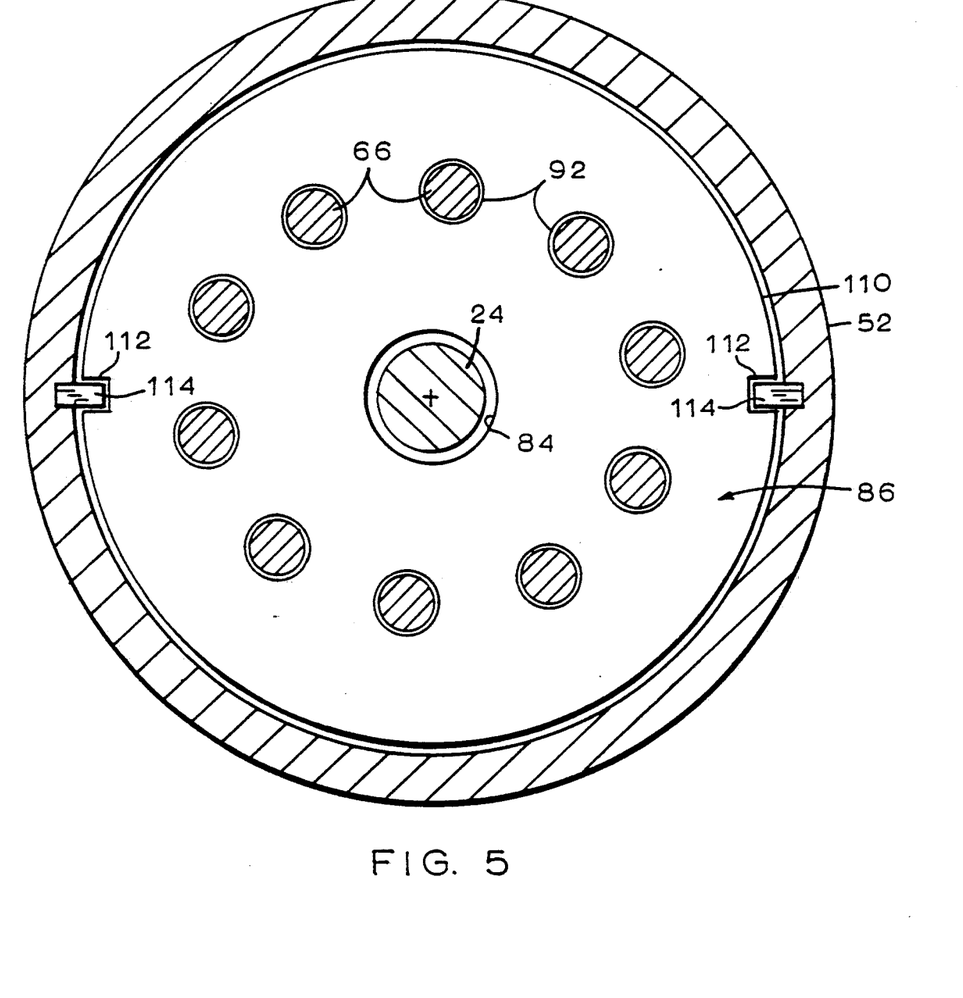
FIG. 5 is a transverse sectional view of the rotary lock illustrated in FIG. 3 taken along line 5—5.

The base plate 86 includes a plurality of circumferentially spaced guide holes 92, as additionally shown in FIG. 5, which face the arm top surfaces 60,60b with each of the guide holes 92 including a tubular pin recess 94 extending outwardly away from the arms 54,54b. The pins 66 extend from the recesses 94 through the plunger guide holes 92 toward the arms 54,54b with each pin 66 including an annular flange 96 fixedly joined to the pin proximal portion 68 and disposed in the pin recess 94. The diameter of the pin recess is predeterminedly greater than the diameter of the guide hole 92, with the diameter of the flange 96 being predeterminedly less than the diameter of the guide recess 94 to allow the pin 66 to translate longitudinally in the recess 94 and through the guide hole 92, with the flange 96 preventing the pin 66 from being ejected from the recess 94 through the guide hole 92.

A plurality of compression pin springs 98 are disposed in respective ones of the pin recesses 94 for providing a spring force on the pin flange 96 for urging the pin flange 96 against the guide hole 92 for positioning the pin intermediate portion 70 outwardly from the plunger base plate 86 toward the arms 54 in an extended position 100 as illustrated in solid line for the right pin illustrated in FIG. 3. The pin extended position 100 is effective for allowing the pin intermediate portion 70 to contact the arm side surface 64,64b for example, when the plunger 82 and the pins 66 are disposed in the deployed position 74.

In the preferred embodiment, the means for urging the pins 66 to one of the withdrawn and deployed positions includes the shaft 24 and the plunger 82 being oriented vertically with the plunger 82 being disposed above the shaft arms 54 for allowing gravity to pull the plunger 82 toward the arms 54 in the deployed position when the solenoid 78 is de-energized. It is possible that when the plunger 82 is deployed, one of the pins 66 will contact an arm top surface 60 as shown in the left-hand side of FIG. 3. Without the pin 66 being disposed in the recess 94, the pin 66 would merely rest upon the arm 54 and would not lock rotation of the shaft 24 until the shaft 24 begins to rotate, allowing the pin 66 to drop between adjacent ones of the shafts 54.

Accordingly, by spring mounting the pins 66 in the plunger 82, if one of the pins 66 contacts one of the arm top surfaces 60 in the deployed position 74, that one pin 66 will be pressed into the recess 94 against the spring 98, thusly positioning the pin 66 in a retracted position 102 as illustrated in the left-hand side of FIG. 3. The longitudinal length of the pin recess 94, therefore, is preselected for allowing the pin 66 to be urged into the recess 94 against the spring 98 in the retracted position 102 when a pin distal portion 104 contacts the arm top surface 60 in the deployed position.

The plunger 82 is positionable in the deployed and withdrawn positions 74,72 for deploying and withdrawing the pin 66 by de-energizing and energizing the solenoid 78, respectively. The solenoid 78 is predeterminedly sized so that when it is energized it is effective for magnetically drawing upwards the plunger 82 away from the arms 54 into the withdrawn position 72. When the solenoid 78 is de-energized, gravity simply drops the plunger 82 into the deployed position 74.

In an alternate embodiment, a plunger compression spring 106 may be disposed around the plunger intermediate portion 88 and between the base plate 86 and the solenoid 78 for urging the plunger base plate 86, including the plurality of pins 66, toward the arms 54 in the deployed position 74 when the solenoid is de-energized. The spring 106 may be used in addition to gravity or as an alternate to gravity where the entire rotary lock 48 is oriented, for example upside down to that shown in FIG. 3. The solenoid 78 is predeterminedly sized for being effective for disposing the plunger 82 in the withdrawn position 72 compressing the plunger compression spring 106 when the solenoid 78 is energized. The plunger intermediate portion 88 in this embodiment has a diameter $D_2$ which is substantially less than the diameter $D_1$ of the base plate 86 and larger than the diameter of the shaft 24 for providing room for positioning the spring 106.

The spring 106 is predeterminedly initially compressed between the support plate 80 and a cover plate 108 suitably fixedly secured to the top end of the base plate 86, by screws for example. The cover plate 108 provides access for assembling the springs 98 and the pins 66 into the recesses 94 and guide holes 92.

As illustrated in more particularity in FIG. 5, the plunger base plate 86 includes an outer perimeter 110 which includes at least one and preferably two longitudinal guide recesses 112 therein. The housing 52 includes a corresponding pair of longitudinal guide rails 114 suitably fixedly joined to the housing 52, by brazing for example, which extend parallel to and into the complementary guide recesses 112. The guide rails 114 are slidably disposed in the recesses 114 for allowing the plunger 86 to move longitudinally along the shaft 24 between the deployed and withdrawn positions while circumferentially restraining the plunger 86, and the pins 66 disposed therein, from rotating about the shaft 24 and longitudinal axis 28 when at least one of the pins 66 contacts the arm side surface 64,64b in the deployed position. Torque transmitted from the arms 54,54b is transferred through the at least one pin 66 contacting a respective arm and in turn is transferred through the plunger base plate 86 and to the stationary housing 52 through the guide recess 112 and rails 114 for providing a positive lock for preventing rotation of the shaft 24. By predeterminedly selecting the number of pins 66 and the widths of the pins 66 and arms 54,54b as measured in the circumferential direction, the amount of maximum rotation of the shaft 24 upon deployment of the pins 66 may be minimized. For example, in the preferred embodiment illustrated in FIG. 4, there are eleven equiangularly spaced pins 66 spaced 36° apart. The arms 54,54b are selected for having a width which is smaller than the spacing between adjacent pins 66 to ensure that the pins 66 may be deployed without interference with the arm top surfaces 60. Accordingly, when the pins 66 are deployed, the arms 54,54b are allowed to rotate only until one of the arms 54 contacts an adjacent pin 66 and thus prevents further rotation of the shaft 24.

In the preferred embodiment, each of the arms 54,54b includes an arcuate, preferably semicircular, notch 116 disposed in respective side surfaces 64,64b of the arms and aligned with the pins 66, against which pins 66 the notches 116 contact when the pins 66 are deployed. The notch 116 is preferred for distributing the load between the pins 66 applied to the arms 54,54b. The pins 66 are predeterminedly sized for particular torque-resisting applications to ensure that they are adequate for accommodating reaction torque without bending or misalignment thereof. The pins 66 may be simply cantilevered from the guide holes 92 with the pin distal portions 104 suitably being unsupported in space.

However, in accordance with a preferred embodiment of the present invention, an annular restraint plate 118, as illustrated in FIG. 3, is predeterminedly spaced from the bottom surfaces 62,62b of the arms 54 and suitably fixedly connected to the housing 52, by brazing or welding for example. The restraint plate 118 includes a plurality of circumferentially spaced restraint holes 120, also shown in FIG. 4, which are longitudinally, coaxially aligned with respective ones of the pins 66 to ensure that the pins 66 may be longitudinally deployed from the guide holes 92 and into respective, opposing ones of the restraint holes 120. The pins are predeterminedly longitudinally sized so that the distal portions 104 are disposed into the restraint holes 120 when the pins 66 and the plunger 82 are positioned in the deployed position 74.

The guide recesses 112 and rails 114, as illustrated in FIGS. 3 and 5, are predeterminedly positioned for longitudinally aligning the pins 66 with respective restraint holes 120. Accordingly, the guide rails 114 allow the plunger 82 to translate longitudinally and parallel to the centerline 28; restrain circumferential rotation of the plunger 82 for accommodating the torque transmitted from the shaft 24 through the pins 66; and longitudinally align the pins 66 with respective restraint holes 120 to ensure that the pins 66 are received in the respective restraint holes 120 when in the deployed position 74. By circumferentially restraining the arms 54,54b from rotation using the plunger 82 and additionally the restraint plate 118, relatively large torque from the shaft 24 may be accommodated since the pins 66 are supported at both ends.

Although one arm 54 may be used for restraining and locking rotation of the shaft 24 against a respective pin 66, the two arms 54,54b described above are preferred. More specifically, by using two arms 54,54b, the arms, pins 66, and restraint holes 120, may be predeterminedly configured so that at least one of the pair of arms 54,54b is always positioned between adjacent ones of the pins 66 for allowing the distal portions 104 of the adjacent ones of the pins 66 to be positioned in respective restraint holes 120 in the deployed position without obstruction by the at least one arm.

For example, where the pins 66 in the restraint holes 120 are equiangularly spaced from each other, the second arm 54b is disposed obliquely to the first arm 54 at an angle A as shown in FIG. 4 for allowing the adjacent pins 66 to enter the respective restaint holes 120 without obstruction by the at least one arm 54b. As shown in FIG. 4, for example, the second arm 54b is positioned circumferentially between adjacent pins 66 whereas the first arm 54 blocks one of the pins 66 from entering its respective restraint hole 120. Alternatively, when the first arm 54 is positioned between adjacent pins 66 to prevent obstruction between the pins 66 and the restraint holes 120, the second arm 54b would be positioned longitudinally in line with one of the pins 66, thereby obstructing the pin 66 from entering its complementary restraint hole 120 (not shown). Various alternate arrangements may be used for ensuring that at least one arm 54 is initially positioned between adjacent pins 66 at the time of deployment for locking the shaft 24. The pins 66 and corresponding restraint holes 120 may be unequally circumferentially angularly spaced and one, two or more arms 54 may be utilized.

It is preferred that at least one arm 54 is positioned between adjacent pins upon deployment to ensure a positive lock between the arm 54 and one of the pins 66 with a minimum amount of initial rotation of the shaft 24 before locking occurs. In an alternate embodiment, one arm 54 could be used, for example, the first arm 54 illustrated in FIG. 4, which could initially be circumferentially aligned with one of the pins 66 for preventing its deployment from the recess 94. In such an embodiment, when the plunger 82 is in the deployed position 74, all of the pins 66 will be received in their respective restraint holes 120 except for the one pin 66 which would be obstructed by the arm 54 as illustrated in FIGS. 3 and 4. In such a situation, upon initial rotation of the shaft 24 and the arm 54 in the backflow occurrence described above, the shaft 24 would rotate until the arm 54 contacts the next adjacent pin 66 disposed in its deployed position which would then stop the arm 54 and the shaft 24. Such initial rotation is equal to about the angular spacing between adjacent pins 66 which allows momentum to build up in the arm 54 prior to contacting the next adjacent pin 66. Although this momentum may be suitably accommodated by predeterminedly sized pins 66 in respective restraint holes 120, for example, the pins 66 may be made smaller where the buildup in momentum may be reduced. By utilizing the two arms 54,54b as preferably spaced as described above, the maximum amount of initial rotation of the shaft 24 and the arm 54 is limited to less than the angular spacing between adjacent pins 66. This reduces momentum buildup in the arm 54 which allows for correspondingly smaller pins 66 and related support structure for minimizing the cost and complexity of the rotary lock 48.

Figure 6:
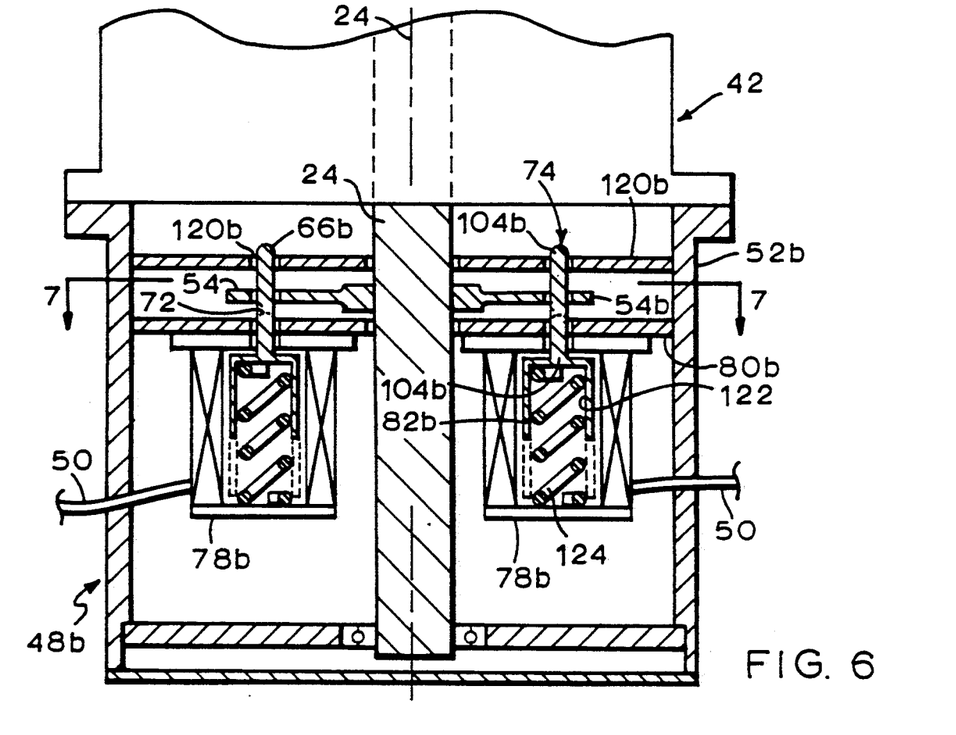
FIG. 6 is a longitudinal sectional view of an alternate embodiment of the present invention taken along line 6—6 in FIG. 7.

Illustrated in FIGS. 6 and 8 is an alternate embodiment of a rotary lock 48b in accordance with the present invention. In this embodiment, at least one and preferably two solenoids 78b are fixedly supported by an annular support plate 80b fixedly joined to the housing 52b. A tubular plunger 82b is conventionally fixedly joined to a proximal end 68b of a respective pin 66b by being welded thereto or formed integrally therewith, for example. The tubular plunger 82b includes a central bore 122 and a solenoid compression spring 124 is disposed in the central bore 122 and the solenoid 78b for moving the pin 66b to the deployed position 74 when the solenoid 78b is de-energized. When the solenoid 78b is energized, it is effective for moving the plunger 82b disposed therein and the pin 66b to the withdrawn position 72. Both solenoids 78b in the embodiment illustrated in FIG. 6 are connected through the electrical lines 50 to the control 44 for simultaneous and coordinated actuation.

A restraining plate 118b is suitably fixedly connected to the housing 52b and spaced from the bottom surfaces of the shaft arms 54,54b. A respective restraint holes 120b is longitudinally, coaxially aligned with a respective one of the pins 66b, and the pins 66b are predeterminedly sized for positioning distal portions 104b into respective restraint holes 120b when in the deployed position 74.

Figure 7:
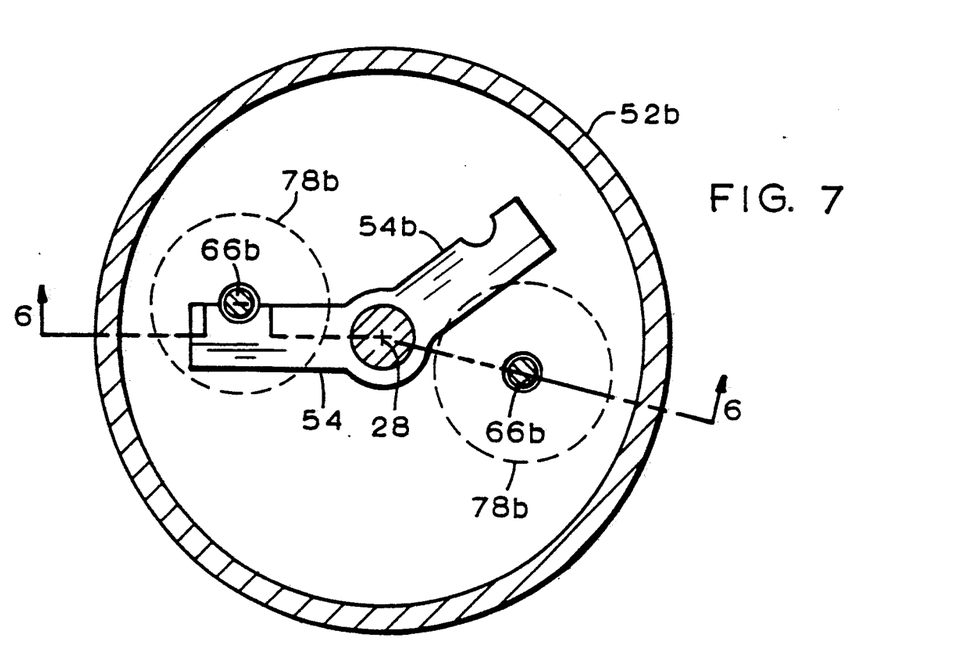
FIG. 7 is a transverse sectional view of the alternate embodiment of the present invention illustrated in FIG. 6 taken along line 7—7.

As illustrated in FIG. 7, since only two solenoids 78b with two respective pins 66b are utilized, only two restraint holes 120b are required for receiving the respective pins 66b. In the preferred embodiment, the pins 66b are colinear with a line passing through the centerline axis 28. In this embodiment, the first and second arms 54,54b are preferably disposed obliquely to each other to ensure that at least one of the arms 54, 54b is not initially obstructing deployment of one of the pins 66b. This arrangement minimizes the amount of momentum buildup in the arms 54,54b upon initial rotation of the shaft 24 prior to the arms 54,54b contacting one of the pins 66b for locking the shaft 24. In the event the shaft 24 is initially stopped and obstructs deployment of one of the pins 66b, that pin 66b will merely be urged by the solenoid 78b against the arm top surface 60 without adverse effect. As soon as the shaft 24 rotates sufficiently to unobstruct the pin 66b, the solenoid 78b will complete its travel of the plunger 82b for positioning the pin 66b in its respective restraint hole 120b.

In both the embodiments described above, the motor 42 and the solenoids 78,78b are energized simultaneously during normal operation to allow the motor 42 to rotate the shaft 24 for positioning the control rod 40 without obstruction by the rotary lock 48,48b. Upon completion of the desired rotation of the motor 42 and positioning of the control rod 40, the motor 42 is de-energized and stopped, and the solenoid 78,78b is de-energized substantially simultaneously so that the pins 66 engage the restraint plate 118. If the shaft 24 then begins to unintentionally rotate, such as for example by the backflow occurrence described above, the shaft 24 will only undergo a limited rotation until one of the arms 54 contacts a pin 66 and is stopped. The pins 66, as described above, provide a positive lock for the shaft 24 to prevent undesirable rotation thereof, including unintentional withdrawal of the control rod 40 from the reactor vessel 10.

The rotary locks 48 as described above provide a positive lock of the shaft 24 to prevent ejection of the control rod 40 from the vessel 10 and allow for relatively simple testing of the rotary locks 48. More specifically, the lock 48 may be simply tested by de-energizing the solenoid 78 for positioning the pins 66 in the deployed position 74 and then energizing the motor 42 to allow the arms 54 to strike a respective pin 66 for preventing further rotation of the shaft 24. Since the motor 42 will be unable to rotate the shaft past the holding pin 66, the motor 42 will stall, which may be conventionally observed by the control 44 for indicating the effective operation of the rotary lock 48. If the rotary lock 48 is unable to prevent rotation of the shaft 24 during testing, the control 44 can provide a suitable indication thereof, which will then result in manual inspection of the rotary lock 48 for correcting any problem that might exist.

Accordingly, the above-described rotary lock 48 in accordance with the present invention provides a positive restraint which locks the shaft 24 from unintentional rotation providing an improvement over a conventional friction-type brake which may allow for slippage. Furthermore, the rotary lock 48 may be tested remotely as described above so that access to the environment adjacent to the nuclear reactor vessel 10 is not required. Yet further, the rotary lock 48 may be tested relatively quickly during normal operation of the reactor vessel 10 without requiring down time of the reactor solely for testing purposes.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A rotary lock for preventing rotation of a shaft of a control rod drive comprising:
    a stationary housing for receiving said shaft;
    an arm having a proximal end fixedly joined to said shaft in said housing, a distal end extending radially outwardly from said shaft, a top surface, and a side surface;
    a pin having a proximal portion joined to said housing for circumferential restraint relative to said shaft, an intermediate portion, and a distal portion, said pin being positioned in a withdrawn position away from said arm top surface for allowing said arm to rotate with said shaft without obstruction from said pin, and in a deployed position for allowing said pin intermediate portion to contact said arm side surface at said arm distal end for preventing rotation of said arm and said shaft; and
    means for selectively positioning said pin in said withdrawn and deployed positions.

2. A rotary lock according to claim 1 wherein said pin positioning means comprises:
    means for urging said pin to one of said withdrawn and deployed positions; and
    an actuator energizable for moving said pin into the other of said withdrawn and deployed positions.

3. A rotary lock according to claim 2 wherein said actuator is a solenoid.

4. A rotary lock according to claim 3 further including a plunger slideably disposed in said solenoid and joined to said pin for moving said pin when said solenoid is energized.

5. A rotary lock according to claim 4 wherein:
    said plunger is tubular and includes a central bore disposed coaxially about said shaft for longitudinal movement relative thereto, a base plate disposed at one end of said plunger adjacent to said arm, an intermediate portion extending from said base plate and through said solenoid, and a flange joined to said intermediate portion at an opposite end of said plunger;
    said plunger base plate includes a plurality of circumferentially spaced guide holes facing said arm, each of said guide holes including a pin tubular recess extending therefrom;
    a plurality of said pins extend from respective ones of said pin recesses through respective ones of said plunger guide holes toward said arm, each pin including a flange joined to said pin proximal portion disposed in said pin recess;
    a plurality of pin springs disposed in respective ones of said pin recesses for providing a spring force on said pin flange for urging said pin flange toward said guide hole for positioning said pin intermediate and distal portions outwardly from said plunger base plate toward said arm in an extended position for allowing said pin intermediate portion to contact said arm side surface in said deployed position, said pin recess having a longitudinal depth effective for allowing said pin to be urged into said recess against said spring in a retracted position when said pin distal portion contacts said arm top surface in said deployed position; and
    said plunger being positionable in said deployed and withdrawn positions for deploying and withdrawing said pins by de-energizing and energizing said solenoid.

6. A rotary lock according to claim 5 wherein said urging means is a plunger compression spring disposed around said plunger intermediate portion and between said base plate and said solenoid for urging said plunger base plate including said plurality of pins toward said arm in said deployed position when said solenoid is de-energized, said solenoid being effective for disposing said plunger and said pins in said withdrawn position and compressing said plunger compression spring when said solenoid is energized.

7. A rotary lock according to claim 5 wherein said urging means comprises said shaft and said plunger being oriented vertically with said plunger being disposed above said shaft arm for allowing gravity to pull said plunger toward said arm in said deployed position when said solenoid is de-energized.

8. A rotary lock according to claim 5 wherein said plunger base plate includes a perimeter having at least one longitudinal guide recess therein, said housing includes a longitudinal guide rail fixedly joined to said housing and extending parallel to and into said guide recess for allowing said plunger to move longitudinally along said shaft between said deployed and withdrawn positions while circumferentially restraining said plunger and said pins from rotating about said shaft when at least one of said pins contacts said arm side surface in said deployed position.

9. A rotary lock according to claim 8 further including a restraint plate spaced from a bottom surface of said shaft arm and having a plurality of circumferentially spaced restraint holes longitudinally aligned with respective ones of said pins, said pins being sized for positioning said distal portions into said restraint holes when in said deployed position.

10. A rotary lock according to claim 9 wherein said guide recess and rail are positioned for longitudinally aligning respective pairs of said pins and said restraint holes.

11. A rotary lock according to claim 10 further comprising a pair of said arms including a first arm and a second arm having side surfaces for contacting respective ones of said pins in said deployed position.

12. A rotary lock according to claim 11 wherein said pins, restraint holes, and arms are configured so that at least one of said pair of arms is positioned between adjacent ones of said pins for allowing said distal portions of said adjacent ones of said pins to be positioned in respective restraint holes in said deployed position without obstruction by said at least one arm.

13. A rotary lock according to claim 12 wherein said pins and said restraint holes are equiangularly spaced from each other and said second arm is disposed obliquely to said first arm for allowing said adjacent pins to enter said respective restraint holes without obstruction by said at least one arm.

14. A rotary lock according to claim 4 further including a support plate fixedly joined to said housing for fixedly supporting said solenoid and wherein said plunger is fixedly joined to said pin proximal portion.

15. A rotary lock according to claim 14 wherein said plunger is tubular having a central bore and further including a solenoid compression spring disposed in said central bore and said solenoid for moving said pin to said deployed position when said solenoid is de-energized, said solenoid being effective for moving said pin to said withdrawn position when energized.

16. A rotary lock according to claim 15 further including a restraint plate spaced from a bottom surface of said shaft arm and having at least one restraint hole longitudinally aligned with said pin, said pin being sized for positioning said pin distal portion into said restraint hole when in said deployed position.

17. A rotary lock according to claim 16 further including two of said solenoids, plungers, solenoid compression springs, pins, and restraint holes.

18. A rotary lock according to claim 17 further comprising a pair of said arms including a first arm and a second arm having side surfaces for contacting respective ones of said pins in said deployed position.

19. A rotary lock according to claim 18 wherein said pins, restraint holes, and arms are configured so that at least one of said pair of arms is positioned between adjacent ones of said pins for allowing said distal portions of said adjacent ones of said pins to be positioned in respective restraint holes in said deployed position without obstruction by said at least one arm.

20. A rotary lock according to claim 19 wherein said pins and said restraint holes are equiangularly spaced from each other and said second arm is disposed obliquely to said first arm for allowing said adjacent pins to enter said respective restraint holes without obstruction by said at least one arm.

* * * * *